(12) United States Patent
Troester et al.

(10) Patent No.: US 11,902,856 B2
(45) Date of Patent: Feb. 13, 2024

(54) ELECTRONIC DEVICE

(71) Applicant: LEGIC Identsystems AG, Wetzikon (CH)

(72) Inventors: Rainer Troester, Duisburg (DE); Marcel Plüss, Tann (CH)

(73) Assignee: LEGIC Identsystems AG, Wetzikon (CH)

( * ) Notice: Subject to any disclaimer, the term of this patent is extended or adjusted under 35 U.S.C. 154(b) by 41 days.

(21) Appl. No.: 17/350,401

(22) Filed: Jun. 17, 2021

(65) Prior Publication Data

US 2021/0400439 A1 Dec. 23, 2021

(30) Foreign Application Priority Data

Jun. 19, 2020 (CH) .................................. 00734/20

(51) Int. Cl.
| | |
|---|---|
| *H04W 4/029* | (2018.01) |
| *H04W 12/03* | (2021.01) |
| *G06F 1/26* | (2006.01) |
| *H04W 56/00* | (2009.01) |

(52) U.S. Cl.
CPC ........... *H04W 4/029* (2018.02); *H04W 12/03* (2021.01); *G06F 1/26* (2013.01); *H04W 56/001* (2013.01)

(58) Field of Classification Search
CPC ... H04W 4/029; H04W 12/03; H04W 56/001; H04W 12/63; H04W 4/023; H04W 12/04; H04W 12/30; G06F 1/26; H04M 1/72454
See application file for complete search history.

(56) References Cited

U.S. PATENT DOCUMENTS

| | | | | |
|---|---|---|---|---|
| 9,824,323 | B1* | 11/2017 | Weiss | H04W 4/02 |
| 10,460,530 | B2* | 10/2019 | Feuillette | G07B 15/02 |
| 2004/0266398 | A1* | 12/2004 | Adamczyk | H04W 4/02 455/466 |
| 2010/0135178 | A1* | 6/2010 | Aggarwal | G01S 5/14 370/252 |
| 2013/0260797 | A1* | 10/2013 | Jones | H04W 4/02 455/456.3 |
| 2016/0291124 | A1* | 10/2016 | Bauer | H04W 64/00 |
| 2017/0192085 | A1* | 7/2017 | Wagner | G01S 5/10 |
| 2018/0084598 | A1* | 3/2018 | Ebling | H04L 12/2863 |
| 2021/0092607 | A1* | 3/2021 | Klinkner | H04W 12/104 |

FOREIGN PATENT DOCUMENTS

| | | | |
|---|---|---|---|
| KR | 20170037802 A | * | 4/2017 |
| WO | 2010/059934 A2 | | 5/2010 |
| WO | 2017/087118 A1 | | 5/2017 |

OTHER PUBLICATIONS

Sep. 22, 2020—(CH) Search Report—App 7342020.

* cited by examiner

*Primary Examiner* — Umair Ahsan
(74) *Attorney, Agent, or Firm* — Banner & Witcoff, Ltd.

(57) ABSTRACT

An electronic device for securely determining current location information regarding the electronic device, the electronic device comprising a radio communication module and a secure element including a processor and a memory, the secure element being connected to the radio communication module and the processor being configured to obtain one or more beacon messages from one or more beacon devices; determine in real-time the current location information, the current location information comprising one or more distances between the electronic device and the beacon devices; and store the current location information in the memory of the secure element.

17 Claims, 3 Drawing Sheets

ELECTRONIC DEVICE

CROSS-REFERENCE TO RELATED APPLICATION

The present application claims priority to and the benefit of Switzerland Patent Application 00734/20 filed Jun. 19, 2020, which is incorporated by reference in its entirety herein.

FIELD OF TECHNOLOGY

The present disclosure relates to an electronic device. In particular, the present disclosure relates to an electronic device for securely determining current location information regarding the electronic device, which includes a radio communication module and a secure element, a mobile phone fitted with a mobile phone case comprising the electronic device, a device configured to be worn or carried by a user comprising the electronic device, and a beacon device fixedly installed comprising the electronic device.

BACKGROUND

Electronic devices are commonplace in all areas of industry and commerce, and in many cases comprise integrated circuits (ICs), which are small semiconductor devices which feature a range of circuits, such as processors which execute program code, and processors which are specially configured for performing particular tasks. Other kinds of semiconductor devices include application specific integrated circuits (ASICs), for example.

In applications where secure execution is required, electronic devices typically feature a secure element, which is used to store sensitive data and run secure applications. These secure elements are typically printed onto the same circuit board as the rest of the ICs of the electronic device. Secure elements are used, for example, to store cryptographic keys such that the rest of the electronic device has no knowledge of, and cannot gain access to, the cryptographic keys. This is to ensure that any malware which may be executed on the electronic device cannot discover or manipulate the cryptographic keys. The cryptographic keys are typically stored in the secure element during manufacture and cannot be altered. Along with simply storing cryptographic keys, these secure elements often provide some additional limited functionality related to cryptography and security, often realized as application specific circuitry. These additional functions include cryptographic functions, functions for detecting tampering of the secure element or the host device, functions for detecting side channel attacks, and so on. This small set of additional functions enables the secure element to, in a limited manner, authenticate credentials, for example, and provide and verify digital signatures.

In the electronic device, the secure element is typically used in conjunction with a general purpose processor. The general purpose processor executes custom program code, often also executing custom program code from a third party, and when use of the secure element is required, messages are sent to and received from the secure element, typically using a system bus.

Applications where the location of a device is required typically can be divided into outdoor and indoor applications. For outdoor applications, satellite based systems such as GPS are typically used, as they require only a GPS receiver. However, the accuracy of GPS and other such systems is limited. Indoor applications typically require several beacon devices to be installed in fixed locations, which emit radio waves allowing a device to determine a position, however, both the security and the inaccuracy of indoor based positioning systems remain problems to be addressed.

SUMMARY

This disclosure provides an electronic device, which electronic device does not have at least some of the disadvantages of the prior art. In particular, the present disclosure provides an electronic device comprising a radio communication module and a secure element.

According to the present disclosure, advantages are achieved through the features of the independent claims. In addition, further advantageous embodiments follow from the dependent claims and the description.

According to the present disclosure, the above-mentioned advantages are particularly achieved in an electronic device for securely determining current location information regarding the electronic device. The electronic device comprises a radio communication module and a secure element including a processor and a memory, the secure element being connected to the radio communication module. One or more beacon messages are received by the radio communication module from one or more beacon devices. The processor is configured to obtain, from the radio communication module, the one or more beacon messages. The processor is configured to determine in real-time the current location information, using transmission properties of the one or more beacon messages, the current location information comprising one or more distances between the electronic device and the beacon devices. The processor is configured to store the current location information in the memory of the secure element.

In an embodiment, the processor is further configured to read, from the one or more beacon messages one or more beacon identifiers, and store a particular beacon identifier in the memory of the secure element, if the distance to the particular beacon device is below a pre-defined proximity threshold and if said distance is maintained for a pre-determined duration threshold.

In an embodiment, the processor is further configured to read, from the one or more beacon messages one or more beacon status indicators. The beacon status indicators indicate a beacon device status and/or a beacon user status. The processor is configured to filter a particular beacon message, from the one or more beacon messages, using a filter parameter and the one or more beacon status indicators and/or a beacon signal strength. The filter parameter is a pre-defined filter parameter or a dynamically set filter parameter. The processor is configured to determine in real-time filtered current location information, using transmission properties of the particular beacon message, and store filtered current location information in the memory of the secure element.

In an embodiment, the radio communication module comprises an ultra-wideband (UWB) radio. The processor is configured to obtain, from the radio communication module, one or more beacon messages received by the ultra-wideband radio from one or more beacon devices.

In an embodiment, the processor is further configured to determine in real-time, using the one or more distances and a known arrangement of the beacon devices, the current location information of the electronic device, and store the current location information in the memory of the secure element.

In an embodiment, the processor is further configured to read, from the one or more beacon messages, one or more beacon coordinates, and determine in real-time, using the one or more distances and the one or more beacon coordinates, the current location information of the electronic device. The processor is configured to store the current location information of the electronic device in the memory of the secure element.

In an embodiment, the processor is configured to determine the current location information as an absolute geographic location in two or three-dimensional space.

In an embodiment, the processor is configured to determine the current location information as a two-dimensional location relative to the beacon devices.

In an embodiment, the processor is further configured to generate a secure identifier of the electronic device, using a cryptographic key stored in the memory of the secure element. The processor is configured to transmit, via the radio communication module, a beacon signal, the beacon signal comprising the secure identifier of the electronic device and/or the current location information of the electronic device.

In an embodiment, the processor is further configured to generate a location information message comprising the one or more distances, the beacon, and/or the current location information. The processor is configured to transmit, using the radio communication module or a wired communication interface, the location information message to an external device.

In an embodiment, the processor is further configured to encrypt the location information message using a first cryptographic key securely stored in a memory of the secure element. The processor is configured to transmit the location information message to a trusted software application of the external device. The trusted software application is configured to decrypt the location information message using a second cryptographic key.

In an embodiment, the processor is further configured to generate the location information message to include a network address of the external device and/or a device identifier uniquely identifying the electronic device. The location information message is configured to be forwarded, via an intermediate device, to the external device according to the network address and/or the device identifier.

In an embodiment, the processor is further configured to receive, via the radio communication module, a secure message comprising a message content and a location indicator. The processor is further configured to decrypt the secure message, using an encryption key stored in the memory. The processor is further configured to determine, using the location indicator and the current location information of the electronic device, whether the electronic device is located at the location indicator, and transmit, if the electronic device is positively determined to be at the location indicator, the message content to the external device.

In an embodiment, the secure element further includes a clock and the processor is configured to receive, via the radio communication module, one or more synchronization messages from the one or more beacon devices, and synchronize the clock in the secure element using the synchronization messages.

In an embodiment, the processor is configured to determine the one or more distances using a time of arrival of each of the beacon messages.

In an embodiment, the electronic device further comprises a movement sensor and the processor is configured to receive, from the movement sensor, movement data indicating a movement of the electronic location device. The processor is configured to determine the current location information of the electronic location device using the movement data.

In addition to an electronic device, the present disclosure also relates to a mobile phone fitted with a mobile phone case comprising an electronic device as disclosed above.

In an embodiment, the mobile phone is configured to provide power to the electronic device via a pluggable connector or magnetic induction.

In addition to an electronic device and a mobile phone, the present disclosure also relates to a device configured to be worn or carried by a user comprising an electronic as disclosed above.

Additionally, the present disclosure also relates to a wireless network access point connected to an electronic device as disclosed above, wherein the wireless network access point is configured to provide power to the electronic device via a pluggable connection.

Additionally, the present disclosure also relates to a beacon device fixedly installed in or on an object, in particular in a building, comprising an electronic device according as disclosed above, wherein the beacon device is installed at a known location.

BRIEF DESCRIPTION OF THE DRAWINGS

The present disclosure will be explained in more detail, by way of example, with reference to the drawings in which.

DETAILED DESCRIPTION

Figure 1:
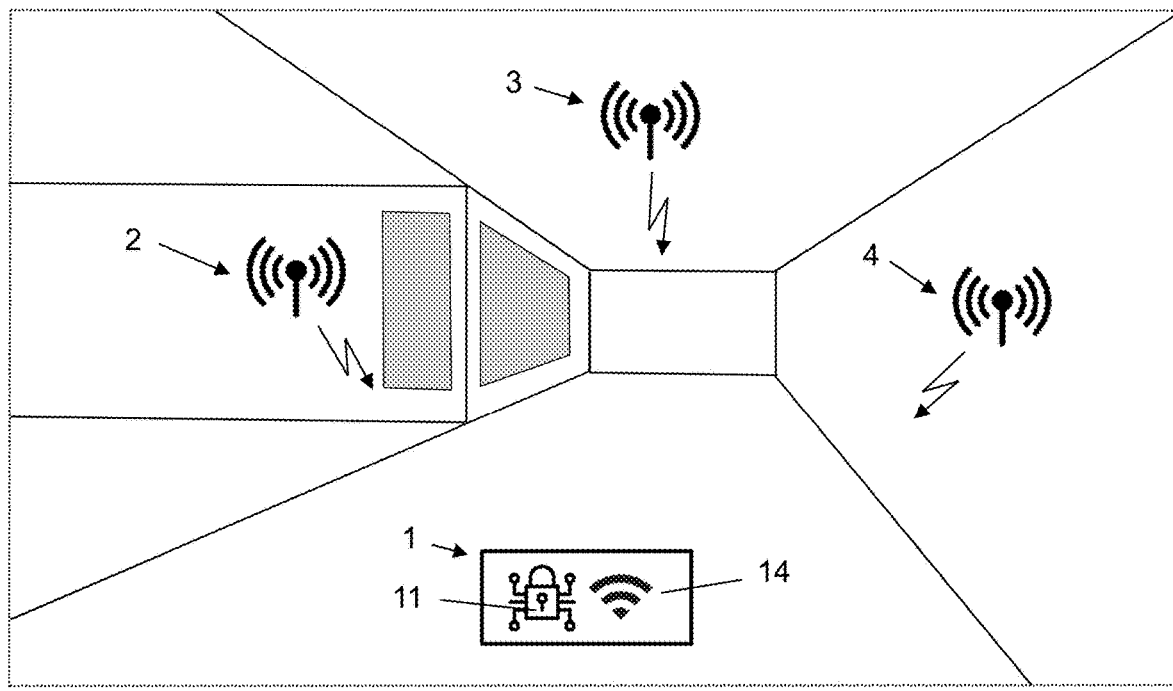
FIG. 1 shows a drawing illustrating schematically an electronic device and a plurality of beacon devices according to an embodiment of the disclosure.

FIG. 1 shows a drawing illustrating schematically an electronic device 1 and a plurality of beacon devices 2, 3, 4 according to an embodiment of the disclosure. The electronic device 1 is located inside a building and the beacon devices 2, 3, 4 are fixedly installed in the building, in particular in fixedly mounted to a wall and/or ceiling.

Figure 2:
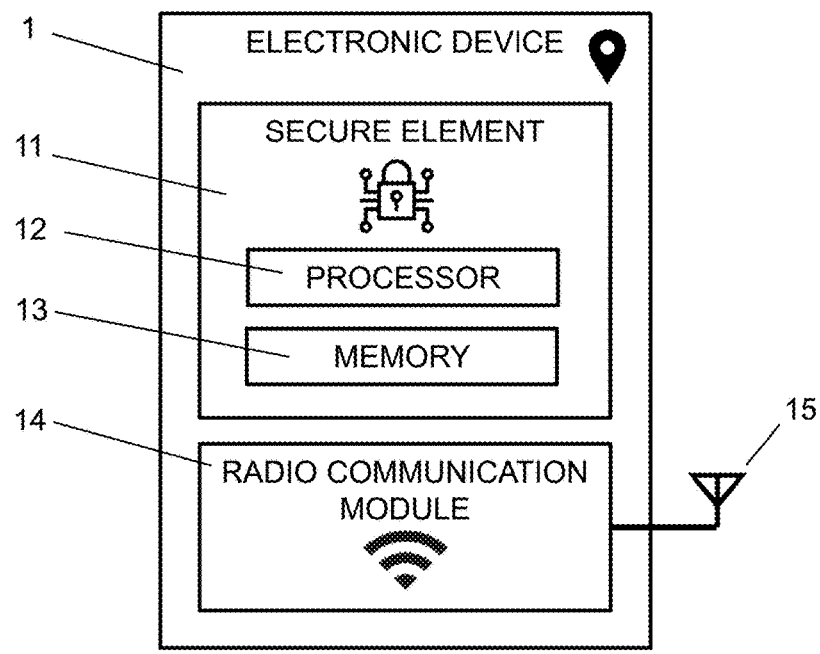
FIG. 2 shows a block diagram illustrating schematically an electronic device according to an embodiment of the disclosure.

FIG. 2 shows a block diagram illustrating schematically an electronic device 1. The electronic device 1 includes a secure element 11 and a radio communication module 14. Depending on the embodiment, the electronic device 1 comprises additional modules, for example a power module. The power module comprises a battery and/or power receiving means, such as a power socket for receiving electrical power via a wired connection and/or a loop antenna for receiving electrical power via magnetic induction. Depending on the embodiment, the electronic device 1 includes an electronic communication circuit configured for communication via a wired connection, described below in more detail. The secure element 11 refers to specific electronic circuitry in electronic device 1 for securely executing specific computer program code, and as such comprises a memory 13 for storing the code, and a processor 12 for executing the code. The person skilled in the art understands that the secure element 11, which comprises the memory 13 and the processor 12, differs from a typical integrated circuit comprising a memory and a processor in a number of ways. Generally speaking, the secure element 11 is configured to store particularly sensitive data and run applications and/or processes securely. Depending on the embodiment, the secure element 11 is configured for tamper resistance or configured to detect tampering, configured to be a root of trust in that it establishes an authentication chain using cryptographic keys stored securely in the memory 13, configured to provide cryptographically secure random number generation, configured to provide cryptographic services (e.g. AES decrypting using a secret key stored in the memory 13, generating a signature of a message using a private key stored in the memory 13, and verifying a signature), configured for secure generation of keys (e.g. generation of a public key pair or of a shared-secret key for authentication), and/or configured to securely monitor further components of the electronic device 1, such as a hardware or software configuration. The person skilled in the art understands that not all of the previously listed features or services must be present in a secure element circuit 3 according to the present disclosure and that at the same time, mere possession of some of these features or services does not qualify a common processor and memory as being a secure element 11 according to the present disclosure.

The processor 12 of the secure element 11 comprises a central processing unit (CPU) for executing computer program code stored in the memory 13. The processor 12 also includes more specific processing units such as application specific integrated circuits (ASICs), reprogrammable processing units such as field programmable gate arrays (FPGAs), or processing units specifically configured to accelerate certain applications, such as cryptographic accelerators for accelerating cryptographic functions.

The memory 13 of the secure element 11 comprises one or more volatile (transitory) and/or non-volatile (non-transitory) storage components. The storage components are non-removable and integrated into the secure element 11. Examples of storage components include RAM (Random Access Memory), flash memory, data memory, and/or other data stores. In an embodiment, the memory 13 is encrypted and protected from unauthorized access.

The memory 13 has stored therein program code configured to control the processor 12 of the secure element 11, such that the secure element 11 performs one or more steps and/or functions as described herein. Depending on the embodiment, the program code is compiled or non-compiled program logic and/or machine code.

The memory 13 stores, in general, both computer program code and data. The memory 13 is partitioned into two or more parts, either by physically provisioning the memory 13 as two or more separate hardware modules, or by logically partitioning the memory 13 into two or more logical partitions. The computer program code is configured to control the processor 12 to execute a series of steps and/or functions. In particular, the computer program code comprises application program code and firmware program code. The application program code is configured to control the processor 12 to execute a series of steps and/or functions as described below. The firmware program code is configured to implement an operating system, which operating system includes the application programming interface (API) and operating system functions. The operating system functions comprise a data receiving function in which the processor 12 of the secure element 11 receives data via the radio communication circuit module 14, and a data transmitting function, in which the processor 12 transmits data via the radio communication module. One skilled in the art is aware that some, depending on the embodiment, some, or even all, of the application program code is contained in the firmware program code, or that vice versa, some or all of the firmware program code is contained in the application program code. Typically, the application program code comprises code specific to a particular embodiment of the disclosure, enabling the electronic device 1 to be flexibly deployed in various technical contexts, as described in below in more detail.

In an embodiment, the firmware program code initially installed and stored in a fixed fashion in the memory 13 of the secure element 11, during manufacture or commissioning of the electronic device 1, includes and/or is limited to a basic device boot function for loading and storing securely further firmware program code and/or application program code into the memory 13 of the secure element 11. Depending on the configuration and/or scenario, the further firmware program code and/or application program code are loaded in one common data file or in separate data files, e.g. in an encrypted data container comprising further firmware program code, in an encrypted data container comprising custom program code, and/or in an encrypted data container comprising further firmware program code and application program code.

The operating system functions further comprise functions to decrypt parts of the received data which are encrypted, as is described below in more detail. The processor 12 uses one or more cryptographic keys stored in the memory 13 of the secure element 11 to decrypt the received data. The cryptographic keys are stored in the memory 13 during manufacture or commissioning of the electronic device 1.

In an embodiment, the firmware program code further includes one or more cryptographic functions, the one or more cryptographic functions comprising an encryption function, a decryption function, a hash function, a cryptographic key generating function, a cryptographic key deletion function, a cryptographic signing function, and/or a cryptographic signature verification function. In an embodiment, one or more of these functions is implemented as an ASIC in the secure element 11 in order to increase the speed of the secure element 11.

In an embodiment, the memory 13 has stored therein a known arrangement of the beacon devices 2, 3, 4. The known arrangement is a spatial arrangement in two or three dimensions. For example, the known arrangement comprises coordinates of the beacon devices 2, 3, 4, the coordinates being absolute coordinates or relative coordinates.

In an embodiment, the firmware program code is further configured to control the processor 12 of the secure element 11 to implement an error checking function. The error checking function checks whether data received in the secure element 11 was received without error and increases the reliability of the received data. In particular, the firmware program code is configured to implement a cyclic redundancy check function. Other error checking functions such as a function to check parity bits, checksum functions, cryptographic hash functions, are also implemented, depending on the embodiment. Further, in a variation, the firmware program code is configured to control the processor 12 of the secure element 11 to implement an error correction function.

In an embodiment, the operating system functions further comprise a random generator function. The random generator function is configured to control the processor 12 to generate random or pseudo-random numbers.

In an embodiment, the secure element 11 of the integrated circuit 2 further includes a hardware-based random generator. The hardware-based random generator amplifies random thermal noise to generate, using an analog-to-digital converter, a random string of digital bits. The secure element 11, in particular the operating system functions, comprise cryptographic functions which use the random string of digital bits. These cryptographic functions can also be implemented as application specific circuits of the secure element 11.

In an embodiment, the electronic device 1 is communicatively coupled to one or more additional processors. These additional processors are external to the electronic device 1 and are part of an external device coupled to the electronic device 1. In some embodiment as described in more detail below, the external device comprises the electronic device 1. The additional processors are communicatively coupled to the electronic device 1 via a wired connection or via a wireless connection. The wired connection is via a cable or a bus, for example using a UART (Universal Asynchronous Receiver/Transmitter) circuit, using an SPI (Serial Peripheral Interface) communication interface specification, using an I2C (Inter-Integrated Circuit) bus, or using a USB (Universal Serial Bus) communication interface. Depending on the embodiment, the radio communication module 14 is configured for wireless communication by having an RFID (Radio Frequency Identification) radio, more specifically a NFC (Near Field Communication) radio, a Bluetooth radio, a Bluetooth Low Energy radio, and/or an ultra-wideband (UWB) radio. In a preferred variation, the radio communication module 14 is directly connected to the antenna 15. Specifically, the radio communication module 14 is in direct electrical contact with the antenna 15, without any intervening circuit elements such as diodes, capacitors, inductors, etc. placed between the radio communication module 14 and the antenna 15. All filtering and signal processing takes place in the radio communication module 14. This allows the electronic device 1 to be manufactured in a smaller space with fewer circuit elements. In an embodiment, the radio communication module 14 is implemented as an analog-to-digital converter and a software-defined radio, which software-defined radio is implemented on a dedicated processor of the radio communication module 14, or implemented on the processor 12 of the secure element.

In an embodiment, the electronic device 1 further comprises a movement module comprising one or more movement sensors configured to detect a spatial movement of the electronic device 1. In an example, the movement sensors are accelerometers, such as capacitive accelerometers, and an acceleration measured by the accelerometer is used to determine a spatial movement of the electronic device 1. In an example, the movement module includes a barometer to measure an atmospheric pressure. The atmospheric pressure is used to determine an elevation and/or a change in height of the electronic device 1.

Figure 3:
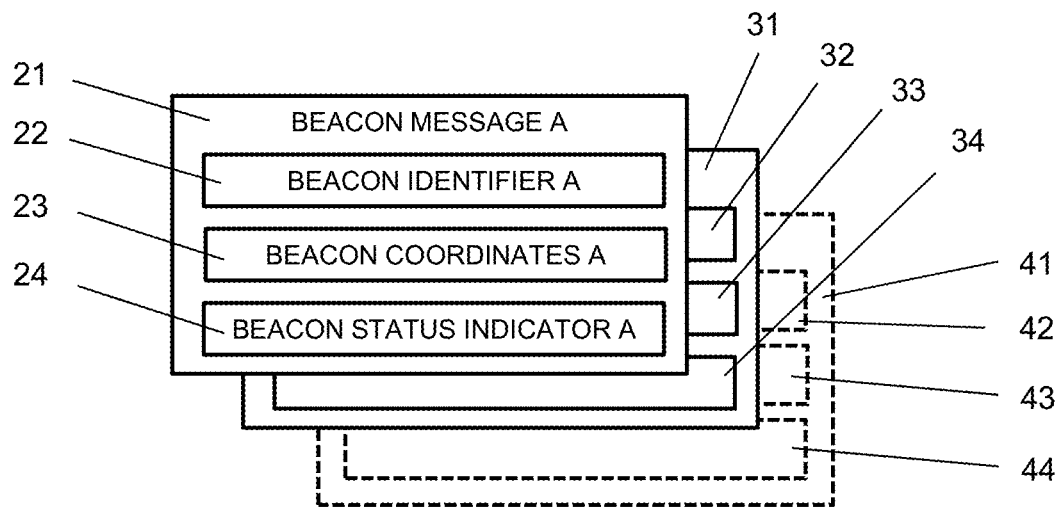
FIG. 3 shows a block diagram illustrating schematically a plurality of beacon messages.

FIG. 3 shows a block diagram illustrating a plurality of beacon messages 21, 31, 41. Each beacon message 21, 31, 41 comprises a beacon identifier 22, 32, 42. The beacon messages 21, 31, 41 are generated and transmitted by the beacon devices 2, 3, 4. The beacon identifier 22, 32, 42 is a piece of data which uniquely identifies the beacon device 2, 3, 4, which generated and transmitted the beacon message 21, 31, 41. In an embodiment, the beacon identifier 22, 32, 42 is a dynamic identifier which changes over time. In particular, the beacon identifier 22, 32, 42 is encrypted using an encryption key.

In an embodiment, the beacon message 21, 31, 41 further comprises beacon coordinates 23, 33, 34 that contain spatial information relating to the precise location, in 2D or 3D space, of the particular beacon device 2, 3, 4. The beacon coordinates 23, 33, 34 are either fixed coordinates in those embodiments where the beacon devices 2, 3, 4 are fixedly installed, or the beacon coordinates 23, 33, 34 are dynamic coordinates indicating a current location of the beacon devices 2, 3, 4, in those embodiments where the beacon devices 2, 3, 4 are not fixedly installed and are mobile, for example are carried by or on a person (or a plurality of persons).

In an embodiment, the beacon messages 21, 31, 41 further comprise beacon status indicators 24, 34, 44, which indicate a beacon device status or a beacon user status. The beacon device status relates to the hardware and/or software configuration of the beacon device 2, 3, 4, for example which hardware modules the beacon devices 2, 3, 4 contains, which software and/or firmware is installed on the beacon device 2, 3, 4, whether the beacon device 2, 3, 4 is fixedly installed or mobile, as is described in relation to FIGS. 6-9 in more detail below. Depending on the embodiment, the beacon device status indicates a transmitting power of the beacon device 2, 3, 4, a transmitting time of the beacon device 2, 3, 4, and/or a path loss model identifier. The beacon user status relates to an embodiment in which the beacon device 2, 3, 4 is carried by or on a person. The beacon user status provides information relating to a health status of the person, a group affiliation of the person to a particular group, for example a demographic group or a business group. In an example, the beacon user status indicates whether the person is currently infectious with an infectious disease, whether the person is over an age of 50 years, and/or whether the person has pre-existing medical conditions.

In an embodiment, the beacon message 21, 31, 41 further comprises an encrypted data package, wherein the encrypted data package is configured such that the data package can only be decrypted when the electronic device 1 is located at one or more specific locations. In an embodiment, the one or more specific locations is comprised in the beacon message 21, 31, 41.

Figure 4:
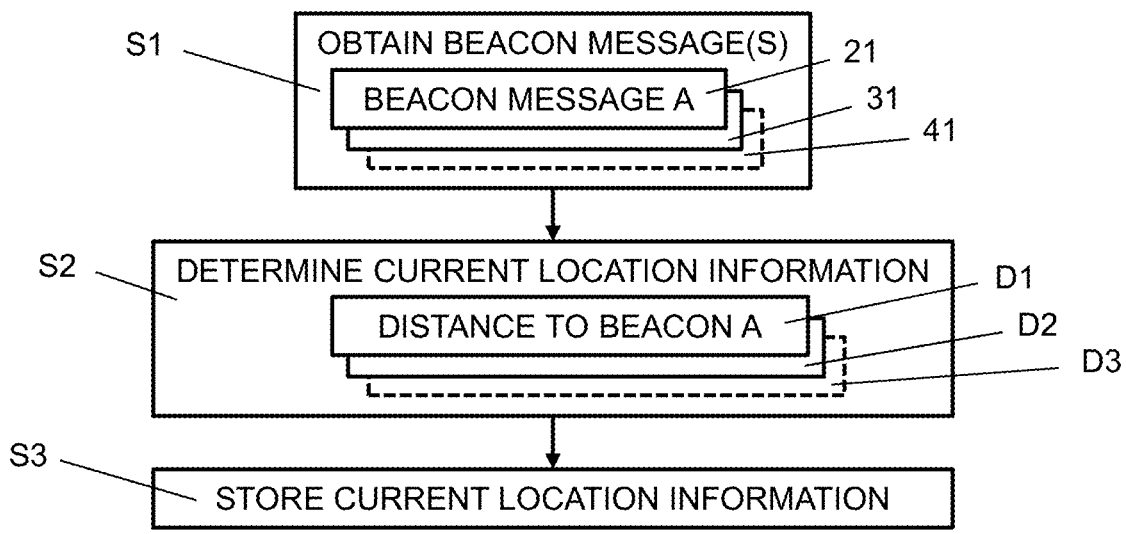
FIG. 4 shows a flow diagram illustrating schematically a plurality of steps performed by an electronic device according to an embodiment of the disclosure.

FIG. 4 shows a flow diagram illustrating an exemplary sequence of steps according to an embodiment of the disclosure. In step S1, the processor 12 of the secure element 11 obtains one or more beacon messages 21, 31, 41. The beacon messages 21, 31, 41 are obtained from the radio communication module 14 via the antenna 15, the beacon messages 21, 31, 41 being received by the radio communication module 14 from beacon devices 2, 3, 4. In step S2, the processor 12 uses the received beacon messages 21, 31, 41 to determine, for each received beacon message 21, 31, 41, a distance D1, D2, D3 between the electronic device 1 and each beacon device 2, 3, 4.

In an embodiment, the Bluetooth low energy radio of the radio communication module 14 determines the distance D1, D2, D3 between the electronic device 1 using the transmission properties of the beacon message 21, 31, 41. In particular, the transmission properties comprise a received signal strength of the received beacon message 21, 31, 41 is compared by the radio communication module 14 or the processor 12 to a reference signal strength that is either a pre-defined reference signal strength stored in the memory 13, or that is contained in the beacon status indicator 24, 34, 44 of the beacon message 21, 31, 41. The processor 12 uses a path loss model stored in the memory 13 to determine the distance D1, D2, D3 using the signal strength, in particular a log-distance path loss model. In an embodiment where the beacon status indicator 24, 34, 44 includes the path loss model identifier, the processor 12 is configured to use the path loss model identifier to select, for use with the path loss model, one of a plurality of path loss models and/or one of a plurality of path loss model coefficients, in particular a log-distance path loss coefficient. This enables the processor 12 to account for a number of different physical environments which affect radio wave transmission, e.g. whether the beacon device 2, 3, 4 is located indoors, outdoor, is fixedly installed in a free-standing manner, is fixedly installed on a wall, or is fixedly installed on a ceiling. Further, the different coefficients are configured to account for different indoor environment types.

In an embodiment, the radio communication module 14 comprises the ultra-wideband radio and is configured to receive and transmit ultra-wideband signals. The ultra-wideband radio is configured to determine distances D1, D2, D3 between the electronic device 1 and the beacon devices 2, 3, 4. The electronic device 1 is configured to determine the distance D1, D2, D3 between a particular beacon device 2, 3, 4 and the electronic device 1 using a time of arrival of the beacon message 21, 31, 41. The electronic device 1, in particular the ultra-wideband radio or the processor 12, is configured to calculate, using the time of arrival, a time of flight and to calculate, from the time of flight, the distance D1, D2, D3. In an embodiment, the time of flight is calculated by using the time of transmission as indicated in the beacon message 21, 31, 41. This requires a clock in the electronic device 1 to be synchronized with the clock in the beacon device 2, 3, 4. In another embodiment, the time of flight is calculated on the basis of a round trip time. The round trip time is calculated by performing a round trip communication, in which the beacon message 2, 3, 4 is transmitted in response to a signal of the electronic device 1, or wherein the electronic device 1 is configured to transmit an additional query signal to the beacon device 2, 3, 4, and receive a response signal from the beacon device 2, 3, 4, subsequent to receiving the beacon message 2, 3, 4.

The distance D1, D2, D3 to each beacon device 2, 3, 4 is stored, in step S3, in the memory 13 of the radio communication module 14. The electronic device 1 is configured to perform the distance determination as well as the storing of the distances D1, D2, D3 as current location information in the secure element 11, ensuring a high level of security. Depending on the embodiment, current location information refers to information relating to the location of the electronic device 1, and includes both relative location information, such as the distances D1, D2, D3 to beacon devices 2, 3, 4. Depending on the embodiment, current location information also relates to a relative or absolute geographic location of the electronic device 1, as defined by a tuple in relation to a set of geographic or spatial coordinates.

In an embodiment, the processor 12 is configured to transmit the current location information, using the radio communication module 14 or other communication means, from the electronic device 1 to the external device.

In an embodiment, transmitting the current location information comprises transmitting current location information for a plurality of time-points in the past. In an embodiment, additional information received from the beacon devices 2, 3, 4 is also transmitted along with, or instead of, the current location information, including beacon identifiers 22, 32, 42, beacon coordinates 23, 33, 43, and/or beacon status indicators 24, 34, 44.

In an embodiment, the processor 12 of the electronic device 1 is configured to store only those distances D1, D2, D3 which correspond to beacon messages 21, 31, 41 received from particular beacon devices 2, 3, 4. In particular, each the processor 21 uses the beacon status indicator 24, 34, 44 contained in each beacon message 21, 31, 41 along with one or more filter parameters to determine whether the beacon message 21, 31, 41, the distance D1, D2, D4, or any other data contained in or derived using the beacon message 21, 31, 41, is to be stored in the memory 13. The processor 12 is configured to use the filter parameters, which filter parameters include all parameters included in the beacon status indicators 24, 34, 44, to determine whether the distances D1, D2, D3 and any other data contained in or determined using the beacon messages 21, 31, 41, is to be stored in the memory 13 or not. In an example, in addition to the filter parameters the processor 12 is configured to use the beacon signal strength to determine whether to store the distance D1, D2, D3, the beacon identifier 22, 32, 42, and/or any further data contained in or derived from the beacon message 21, 31, 41, associated with a particular beacon device 2, 3, 4.

In an embodiment, the filter parameters are pre-defined and stored in the memory 13.

In an embodiment, the filter parameters are set dynamically. The processor 12 is configured to adapt the filter parameters according to a set of filter rules stored in the memory 13. The filter rules define locations and/or times during which the filter parameters are adapted.

In an embodiment, the processor 12 is configured to use the distances D1, D2, D3 along with the known arrangement of beacon devices 2, 3, 4 to securely determine the current location of the electronic device 1. The current location is the relative or absolute position of the electronic device in two or three-dimensional space. The known arrangement of beacon devices 2, 3, 4 is either retrieved from memory 13 or generated using the beacon coordinates 23, 33, 43 received in the beacon messages 21, 31, 41. The current location is stored, along with the current time, in the memory 13.

In an embodiment, the processor 12 is configured to receive, from the movement sensor, movement data relating to a movement of the electronic device 1, and determine the current location information of the electronic device 1 using the movement data along with the distances D1, D2, D3.

In an embodiment, the processor 12 is configured to generate a location information message. The location information message comprises the current location information. In an embodiment, the location information message further comprises at least one beacon identifier 22, 32, 42 received in at least one beacon message 21, 31, 41. In an embodiment, the location information message comprises the distances D1, D2, D3. In an example, the location information message comprises not only the current location information, but also current location information for time-points in the past. The processor 12 is configured to transmit the location information message, via the radio communication module 14 or the wired connection, to the external device, in particular to a trusted software application running on the external device.

In an embodiment, the location information message is secured through encryption. This ensures that the location information cannot be read if intercepted by a third party device and/or third party application. The processor 12 is configured to encrypt the location information message using a first cryptographic key stored in the memory 13. The location information message is encrypted such that the trusted software application is able to decrypt the location information message using a second cryptographic key.

In an embodiment, the location information message is transmitted to the external device via an intermediate device. The external device is, in an embodiment, a back-end server system. The location information message is configured by the processor 12 to include a network address of the external device and/or a device identifier uniquely identifying the electronic device 1. The intermediate device is, in an embodiment, a user device such as a mobile phone, or a gateway device such as a network access point. The location information message is configured such that the intermediate device either requires no pre-defined network address to forward the location information message to, or such that the intermediate device performs a look-up of the network address using the device identifier.

In an embodiment, the electronic device 1, in particular the processor 12, receives a location request. The location request is received from the external device. The processor 12 is configured to transmit, in response to receiving the location request, the location information message. In an embodiment, the location request comprises credentials. The credentials are used by the processor 12 to determine whether the location request is authentic and/or authorized. The processor 12 is configured to transmit the location information message contingent on a positive determination of whether the location request is authentic and/or authorized.

In an embodiment, the electronic device 1 is configured to unlock messages based on the current location information. The electronic device receives, via the radio communication module 14 or the wired connection, a secure message, for example from the external device. The secure message comprises a message content and a location indicator. The secure message is decrypted by the processor 12 using an encryption key stored in the memory 13. The processor 12 then verifies if the location indicator matches the current location information of the electronic device 1. If the location indicator matches the current location information of the electronic device 1, the message content is transmitted, via the radio communication module 14 or the wired connection, to the external device. Depending on the embodiment, matching the current location information means matching to within a particular tolerance or distance, or being within a certain region. For example, if the secure message contains media content locked to a particular region, the location indicator may indicate a country, and the location indicator matching the current location information requires the current location information to be within the country as indicated by the location indicator. In another example, if the secure message contains access control information, the location indicator indicates a small region at an access control area no larger than a few square meters, or indicates a particular point in addition to a matching tolerance. Applications running on the external device, for example trusted applications, can therefore use the electronic device 1 to unlock messages based on securely determined current location information. In an embodiment, in addition to the location indicator, a time indicator is also contained in the secure message, and the processor 12 is configured to transmit the message content to the external device only if the time indicator also matches a current time as provided to the processor 12 by the clock of the electronic device 1.

In an embodiment, the clock of the electronic device 1 is configured to be adjustable. In one example, the clock of the electronic device 1 is synchronized using a GPS time signal received either directly in a GPS module of the electronic device 1, or forwarded to the electronic device 1 from the external device, preferably via the direct wired connection. In an embodiment, the processor 12 is configured to perform a decentralized clock synchronization with the beacon devices 2, 3, 4, to ensure accurate determining of the distances D1, D2, D3. The processor 12 is configured to adjust the clock of the secure element 11 according to synchronization messages received via the radio communication module 14 from the beacon devices 2, 3, 4, and to synchronize the clock in the secure element 11 using the synchronization messages received.

In an embodiment, the electronic device 1 is further configured to act as a beacon by emitting a beacon signal. In an environment comprising a plurality of electronic devices 1, beacon signals emitted by each electronic device 1 enable a location mesh network to form in which each electronic device 1 is configured to determine its own current location information and forward this current location information to surrounding electronic devices 1. In particular, the processor 12 of the electronic device 1 is configured to generate the beacon signal comprising a secure identifier of the electronic device 1 and/or the current location information of the electronic device 1. The secure identifier of the electronic device 1 is generated using a cryptographic key stored in the memory 13 of the secure element 11. In an embodiment, in addition to the cryptographic key, a random number generated by the random generator function is used by the processor 12 to generate the secure identifier, the random number used then being stored in the memory 13. The processor 12 is configured to identify whether the secure identifier was generated using the cryptographic key and, in an embodiment, the random number.

Figure 5:
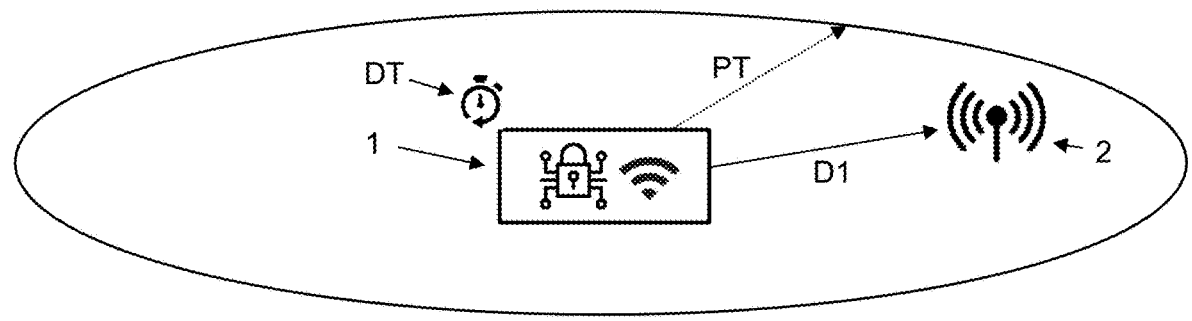
FIG. 5 shows a drawing illustrating schematically an electronic device located within a pre-defined proximity threshold of a beacon device for a pre-defined duration threshold.

FIG. 5 shows a drawing illustrating schematically an embodiment where the electronic device 1 and the beacon device 2 move relative each other. The electronic device 1 and/or the beacon device 2 are mobile such that the distance D1 between the electronic device 1 and the beacon device 2 varies over time. The processor 12 of the secure element 11 of the electronic device 1 is configured to obtain a plurality of beacon messages 21 from the beacon device 2 at a plurality of time points. The distance D1 is determined by the processor 12 for each of the plurality of time points and stored in the memory 14. The processor 12 determines whether the distance D1 is below a pre-defined proximity threshold PT for a pre-defined duration threshold DT. In particular, the processor 12 checks whether the distance D1, across a plurality of time-points corresponding to the pre-defined duration threshold DT, is below the pre-defined proximity threshold PT. The pre-defined duration threshold DT is 30 minutes or more, preferably 15 minutes or more, more preferably 10 minutes or more. The pre-defined proximity threshold PT is 10 meters or less, preferably 5 meters or less, more preferably 2 meters or less.

In an embodiment, in addition to determining whether the beacon device 2 is within the pre-defined proximity threshold PT for the pre-defined duration threshold DT, the processor 12 checks whether the mean of the distance D1 for a plurality of time-points is within the pre-defined proximity threshold PT. In a further embodiment, the processor 12 is configured to check whether the beacon device 2 is within the pre-defined proximity threshold PT for a cumulative time period exceeding the pre-defined duration threshold DT, wherein time periods of individual instances of the beacon device 2 being within the pre-defined proximity threshold PT are summed over a long-term time period, for example one day, more preferably, one hour.

If the beacon device 2 is within the pre-defined proximity threshold PT for a pre-defined duration threshold DT, the processor 12 is configured to store in the memory 13 the beacon identifier 22 of the beacon device 2.

In an embodiment, the processor 12 is configured to implement a dynamic proximity threshold PT and/or a dynamic duration threshold DT. The processor 12 is configured to decrease the proximity threshold PT if the electronic device 1 is moving, for example decreasing the proximity threshold PT from 5 meters to 2 meters if the electronic device 1 is moving. In an embodiment, the processor 12 is further configured to increase the duration threshold DT when the electronic device 1 is moving, for example increasing the duration threshold DT from 10 minutes to 15 minutes. When the electronic device 1 is stationary the proximity threshold PT and/or the duration threshold DT revert to their default pre-defined values. In an embodiment, the processor 12 is configured to implement a dynamic proximity threshold PT and/or a dynamic duration threshold DT in which the processor 12 checks uses the current location of the electronic device 1 along with a map stored in the memory 13 to determine whether the processor 12 is inside a building and/or an enclosed space. If the processor 12 determines that the electronic device 1 is inside a building and/or an enclosed space the duration threshold PT is reduced and the proximity threshold DT is increased, for example increasing the proximity threshold PT from 5 meters to 10 meters if the electronic device 1 is inside a building or room, and/or decreasing the duration threshold DT from 10 minutes to 5 minutes.

Figure 6:
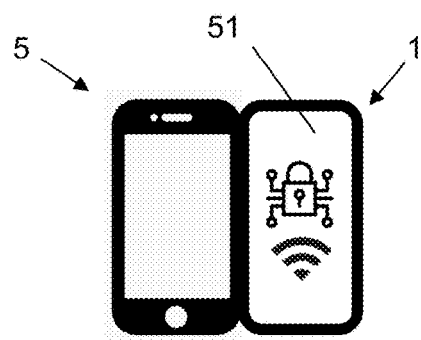
FIG. 6 shows a drawing illustrating schematically a mobile phone fitted with a mobile phone case comprising an electronic device according to an embodiment of the disclosure.

FIG. 6 shows a block diagram illustrating schematically a mobile phone 5 fitted with a mobile phone case 51 comprising an electronic device 1 as described above. In particular, the electronic device 1 is connected to the mobile phone 5 via a data connection mechanism, for example a wired cable. Alternatively, the electronic device 1 is connected to the mobile phone 5 via a wireless connection, in particular a Bluetooth or NFC connection.

In an embodiment, the electronic device 1 is configured to draw power from the mobile 5 via either a wired connection or by electromagnetic induction via the loop antenna.

The processor 12 of the electronic device 1 is configured to transmit data from the memory 13 to the mobile phone 5. In particular, the processor 12 of the electronic device 1 is configured to transmit current location information to a secure application running on the mobile phone 5. The processor 12 of the electronic device 1 is configured to encrypt the current location information and transmit the encrypted current location information to the secure application, ensuring secure transmission of the current location information.

In an embodiment, the processor 12 of the electronic device 1 is configured to transmit the encrypted data package to the mobile phone 5, wherein the encrypted data package is configured such that the data package can only be decrypted when the electronic device 1 is located at one or more specific locations. In particular, the encrypted data package is transmitted by the processor to the trusted software application running on the mobile phone 5 and is configured such that the trusted software application is able to decrypt the data package only when the mobile phone 5 is located at one or more specific locations. Specifically, the encrypted data package is configured such that it is decrypted using the current location information, in particular the current location of the electronic device 1, transmitted from the electronic device 1 to the mobile phone 5.

Figure 7:
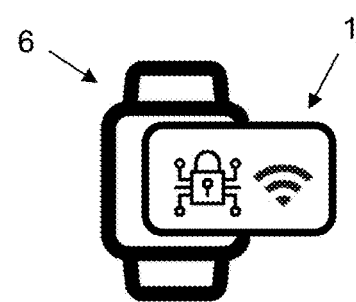
FIG. 7 shows a drawing illustrating schematically a smart device configured to be worn or carried by a user comprising an electronic device according to an embodiment of the disclosure.

FIG. 7 shows a drawing illustrating schematically a smart device 6 configured to be worn or carried by a user comprising an electronic device 1 as described above. The smart device 6 is embodied as a smart watch. Other embodiments of smart devices 6 word or carried by a user include smart pendants, smart cards, key cards, fobs, smart rings, and other electronic devices which are worn on a person, carried by a person (e.g. attached to a keychain), or carried in a person's possessions (e.g. in a briefcase, handbag, jacket pocket, etc.).

In an embodiment, the smart device 6 provides a HMI (human-machine interface), including such elements as a display, buttons, audio transducer, and/or microphone. The smart device 6 is configured to receive the current location information from the electronic device 1.

Figure 8:
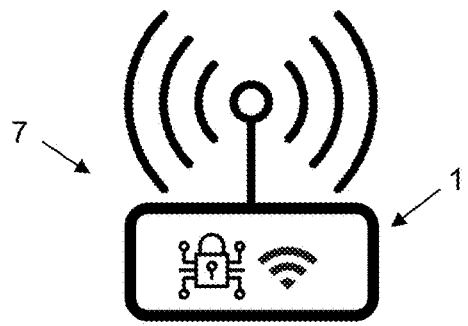
FIG. 8 shows a drawing illustrating schematically a wireless network access point connected to an electronic device according to an embodiment of the disclosure.

FIG. 8 shows a drawing illustrating schematically a wireless network access point 7 connected to an electronic device 1 as described above. The electronic device 1 is either plugged into the wireless network access point 7, for example using a USB connection, or is integrated into the wireless network access point 7. The wireless network access point 7 is fixedly installed in or on a building at a known location. The wireless network access point 7 is an access point of a WLAN (wireless local area network).

Figure 9:
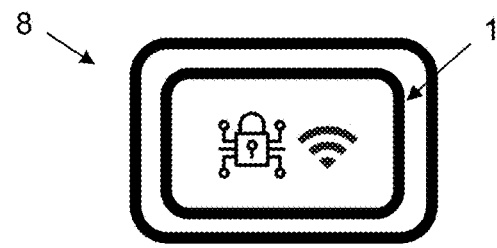
FIG. 9 shows a drawing illustrating schematically a beacon device fixedly installed in or on an object comprising an electronic device according to an embodiment of the disclosure.

FIG. 9 shows a drawing illustrating schematically a beacon device 8 fixedly installed in or on an object, comprising an electronic device 1 as described above. The beacon device 8 is, in an example, fixedly mounted to a wall at a known location. The electronic device 1 is configured to transmit the known location of the beacon device 8. In particular, the electronic device 1 is configured to transmit absolute coordinates and/or relative coordinates of the known location, either as two dimensional or three dimensional coordinates as part of a periodic signal emitted by the electronic device 1, specifically by the radio communication module 14.

What is claimed is:

1. An electronic device comprising a radio communication module and a secure element including a processor and a memory, the secure element being connected to the radio communication module and the processor being configured to:
    obtain, from the radio communication module, a first beacon message received by the radio communication module from a beacon device at a first time point,
    determine in real-time a first distance between the electronic device and the beacon device at the first time point, obtain, from the radio communication module, a second beacon message received by the radio communication module from the beacon device at a second time point, wherein the first time point and the second time point are different time points, determine in real-time a second distance between the electronic device and the beacon device at the second time point, determine whether the first distance and the second distance are below a proximity threshold for the beacon device with respect to the electronic device, and upon determining that the first distance and the second distance are below the proximity threshold, store a beacon identifier of the beacon device in the memory of the secure element, read, from the first beacon message or the second beacon message, a beacon status indicator indicating at least one of: a beacon device status or a beacon user status, the beacon user status indicative of a status of a user associated with the beacon device, filter a particular message, from the read first beacon message or second beacon message, using a filter parameter and at least one of: the beacon status indicator or a beacon signal strength, wherein the filter parameter is a dynamically set filter parameter adapted according to a set of filter rules stored in the memory, the filter rules defining at least locations or times during which the filter parameters are adapted, determine in real-time filtered current location information using transmission properties of the particular beacon message, and store filtered current location information in the memory of the secure element.

2. The electronic device of claim 1, wherein the processor is further configured to:
read, from the first or second beacon messages, the beacon identifier.

3. The electronic device of claim 1, wherein the radio communication module comprises an ultra-wideband radio and the processor is configured to:
obtain, from the radio communication module, one or more beacon messages received by the ultra-wideband radio from one or more beacon devices.

4. The electronic device of claim 1, wherein the processor is configured to determine in real-time the current location information of the electronic device further using a known arrangement of the beacon device.

5. The electronic device of claim 1, wherein the processor is configured to:
read, from the first or second beacon message, one or more beacon coordinates, and
determine in real-time current location information of the electronic device using the one or more beacon coordinates.

6. The electronic device of claim 1, wherein the processor is further configured to:
generate, using a cryptographic key stored in the memory of the secure element, a secure identifier of the electronic device, and
transmit, via the radio communication module, a beacon signal, the beacon signal comprising one or more of: the secure identifier of the electronic device or current location information of the electronic device.

7. The electronic device of claim 1, wherein the processor is further configured to:

generate a location information message comprising one or more of: the first distance, the second distance, the beacon identifier, or current location information, and
transmit, using the radio communication module or a wired communication interface, the location information message to an external device.

8. The electronic device of claim 7, wherein the processor is further configured to encrypt the location information message using a first cryptographic key securely stored in a memory of the secure element, and transmit the encrypted location information message to a trusted software application of the external device.

9. The electronic device of claim 7, wherein the processor is further configured to generate the location information message to include a network address of the external device or a device identifier uniquely identifying the electronic device, the encrypted location information message being configured to be forwarded, via an intermediate device, to the external device according to the network address or the device identifier uniquely identifying the electronic device.

10. The electronic device of claim 1, wherein the processor is further configured to:
receive, via the radio communication module, a secure message comprising a message content and a location indicator,
decrypt, using an encryption key stored in the memory, the secure message,
determine, using the location indicator and the current location information of the electronic device, whether the electronic device is located at the location indicator, and
transmit, if the electronic device is positively determined to be at the location indicator, the message content to the external device.

11. The electronic device of claim 1, wherein the secure element further includes a clock and the processor is configured to:
receive, via the radio communication module, one or more synchronization messages from the beacon device, and
synchronize the clock in the secure element using the synchronization messages.

12. The electronic device of claim 1, further comprising a movement sensor and wherein the processor is configured to:
receive, from the movement sensor, movement data indicating a movement of the electronic device, and
determine the current location information of the electronic device using the movement data.

13. A mobile phone fitted with a mobile phone case comprising an electronic device comprising a radio communication module and a secure element including a processor and a memory, the secure element being connected to the radio communication module and the processor being configured to:
obtain, from the radio communication module, a first beacon message received by the radio communication module from a beacon device at a first time point,
determine in real-time a first distance between the electronic device and the beacon device at the first time point,
obtain, from the radio communication module, a second beacon message received by the radio communication module from the beacon device at a second time point, wherein the first time point and the second time point are different time points, determine in real-time a second distance between the electronic device and the beacon device at the second time point, determine whether the first distance and the second distance are below a proximity threshold for the beacon device with respect to the electronic device, and upon determining that the first distance and the second distance are below the proximity threshold, store a beacon identifier of the beacon device in the memory of the secure element, read, from the first beacon message or the second beacon message, a beacon status indicator indicating at least one of: a beacon device status or a beacon user status indicative of a status of a user associated with the beacon device, filter a particular beacon message, from the read first beacon message or the second beacon message, using a filter parameter and at least one of: the beacon status indicator or a beacon signal strength, wherein the filter parameter is a dynamically set filter parameter adapted according to a set of filter rules stored in the memory, the filter rules defining at least locations or times during which the filter parameters are adapted, determine in real-time filtered current location information using transmission properties of the particular beacon message, and store filtered current location information in the memory of the secure element.

14. The mobile phone of claim 13, wherein the processor is further configured to:

read, from the first or second beacon messages, the beacon identifier.

15. The mobile phone of claim 13, wherein the radio communication module comprises an ultra-wideband radio and the processor is configured to:

obtain, from the radio communication module, one or more beacon messages received by the ultra-wideband radio from one or more beacon devices.

16. A wireless network access point connected to an electronic device comprising a radio communication module and a secure element including a processor and a memory, the secure element being connected to the radio communication module and the processor being configured to:

obtain, from the radio communication module, a first beacon message received by the radio communication module from a beacon device at a first time point, determine in real-time a first distance between the electronic device and the beacon device at the first time point, obtain, from the radio communication module, a second beacon message received by the radio communication module from the beacon device at a second time point, wherein the first time point and the second time point are different time points, determine in real-time a second distance between the electronic device and the beacon device at the second time point, determine whether the first distance and the sec and distance are below a proximity threshold for the beacon device with respect to the electronic device, and upon determining that the first distance and the second distance are below the proximity threshold, store a beacon identifier of the beacon device in the memory of the secure element, read, from the first beacon message or the second beacon message, a beacon status indicator indicating at least one of: a beacon device status or a beacon user status indicative of a status of a user associated with the beacon device, filter a particular beacon message, from the read first beacon message or the second beacon message, using a filter parameter and at least one of: the beacon status indicator or a beacon signal strength, wherein the filter parameter is a dynamically set filter parameter adapted according to a set of filter rules stored in the memory, the filter rules defining at least locations or times during which the filter parameters are adapted, determine in real-time filtered current location information using transmission properties of the particular beacon message, and store filtered current location information in the memory of the secure element, wherein the wireless network access point is configured to provide power to the electronic device via a pluggable connection.

17. The wireless network access point of claim 16, wherein the processor is configured to determine in real-time the first distance and the second distance of the electronic device using a known arrangement of the beacon device.

* * * * *